(12) United States Patent
Harris et al.

(10) Patent No.: US 7,395,319 B2
(45) Date of Patent: Jul. 1, 2008

(54) SYSTEM USING CONTACT LIST TO IDENTIFY NETWORK ADDRESS FOR ACCESSING ELECTRONIC COMMERCE APPLICATION

(75) Inventors: Mark T. Harris, Westerville, OH (US); Hans D. Dreyer, Pataskala, OH (US); Donald Kenneth Hobday, Jr., Blacklick, OH (US)

(73) Assignee: CheckFree Corporation, Norcross, GA (US)

( * ) Notice: Subject to any disclaimer, the term of this patent is extended or adjusted under 35 U.S.C. 154(b) by 998 days.

(21) Appl. No.: 10/748,678

(22) Filed: Dec. 31, 2003

(65) Prior Publication Data

US 2005/0182837 A1    Aug. 18, 2005

(51) Int. Cl.
*G06F 15/16* (2006.01)
(52) U.S. Cl. .................... 709/219; 709/217; 709/218
(58) Field of Classification Search .............. 709/201, 709/217, 218, 219; 705/39, 14; 707/1, 104.1; 379/218.01, 265.13, 80; 708/800
See application file for complete search history.

(56) References Cited

U.S. PATENT DOCUMENTS

| | | | |
|---|---|---|---|
| 4,864,497 A | 9/1989 | Lowry | |
| 5,566,330 A | 10/1996 | Sheffielf | |
| 5,701,423 A | 12/1997 | Crozier | |
| 6,049,796 A | 4/2000 | Siitonen | |
| 6,253,203 B1 | 6/2001 | O'Flaherty | |
| 2002/0035556 A1 | 3/2002 | Shah | |
| 2002/0196922 A1* | 12/2002 | Marwell et al. | 379/218.01 |
| 2003/0084050 A1 | 5/2003 | Hall | |
| 2003/0174814 A1* | 9/2003 | Diacakis | 379/80 |
| 2003/0236769 A1* | 12/2003 | Pyhalammi | 707/1 |
| 2004/0078191 A1* | 4/2004 | Tian et al. | 704/9 |
| 2004/0128322 A1* | 7/2004 | Nagy | 707/104.1 |
| 2004/0143491 A1* | 7/2004 | Steinberg | 705/14 |
| 2004/0151300 A1* | 8/2004 | Marwell et al. | 379/265.13 |
| 2004/0230636 A1* | 11/2004 | Masuoka et al. | 708/800 |
| 2005/0144121 A1* | 6/2005 | Mayo | 705/39 |

OTHER PUBLICATIONS

IFollow Network Address Book. PDF at: www.followap.com/images/downloads_files/iFollow_NAB_Brochure_Apr03.pdf.

* cited by examiner

*Primary Examiner*—Le Luu
(74) *Attorney, Agent, or Firm*—Sutherland Asbill & Brennan LLP

(57) ABSTRACT

A technique for accessing an electronic commerce function (ECF) is provided. A first signal identifying an entity and an ECF associated with the entity is transmitted to a user from a contact list service. The user selects the ECF, causing a second signal indicating the selection to be transmitted to the contact list service. In response to receipt of the second signal, the contact list service transmits a third signal. The third signal identifies a network address associated with an electronic commerce service provider for providing and/or facilitating the ECF. The third signal also identifies information associated with the entity. The third signal, either directly or indirectly, is operable to cause a fourth signal to be transmitted to the user from the service provider. The fourth signal includes information associated with invoking the ECF and is based upon the information associated with the entity included in the third signal.

33 Claims, 11 Drawing Sheets

| General | | Application-Specific (EBP) | |
|---|---|---|---|
| Public | Private | Private | Hidden |
|  | Name<br>• Last name<br>• First name<br>• Title<br>• Company | Alternate name<br>• Alt last name<br>• Alt first name<br>• Alt title<br>• Alt company | Scrubbed name<br>• Scrubbed last name<br>• Scrubbed first name<br>• Scrubbed title<br>• Scrubbed company |
|  | Address<br>• Street<br>• City<br>• State<br>• Zip<br>• Country | Alternate address<br>• Alt street<br>• Alt city<br>• Alt state<br>• Alt zip<br>• Alt country | Scrubbed address<br>• Scrubbed street<br>• Scrubbed city<br>• Scrubbed state<br>• Scrubbed zip<br>• Scrubbed country |
|  | Phone #s<br>• Work phone #<br>• Home phone #<br>• Fax phone #<br>• Mobile phone #<br>• Other phone # | Alt phone #s<br>• Alt work phone #<br>• Alt home phone #<br>• Alt fax phone #<br>• Alt mobile phone #<br>• Alt other phone # | Scrubbed phone #s<br>• Scrubbed work phone #<br>• Scrubbed home phone #<br>• Scrubbed fax phone #<br>• Scrubbed mobile phone #<br>• Scrubbed other phone # |
|  | Email ID | Alt email ID | Scrubbed email ID |
|  | Custom field(s) | Application | Entity identifier |
|  | Categorization | Account number | Scrubbed account number |
|  |  | Deposit account #<br>• RTN<br>• DDA | Scrubbed deposit account #<br>• Scrubbed RTN<br>• Scrubbed DDA |
|  |  | Account ID (e.g., UPIC) | Scrubbed account ID (e.g., UPIC) |
|  |  | Remote network ID | Scrubbed remote network ID |
| • | • | • | • |

FIGURE 1

Summary View

| Name | Company | Primary Contact | Category | Applications |
|---|---|---|---|---|
| Diebold, Karen | Smallville Optometrists | (222) 222-2222 | Business | |
| Pearson, Thomas | Smallville Mutual Insurance | kdiebold@smallvilleins.com | Business | $ $ |
| Santilli, Carlos | | (444) 444-4444 | Friends | ☒ ☒ ☒ ☒ |
| | | carlos.santilli@yahoo.com | Friends | |

SYSTEM USING CONTACT LIST TO IDENTIFY NETWORK ADDRESS FOR ACCESSING ELECTRONIC COMMERCE APPLICATION

FIELD OF THE INVENTION

The present invention is related to a contact list, and more particularly to a contact list and method for accessing computing application functionality.

BACKGROUND OF THE INVENTION

Many computing applications, including Web-based applications, have user-specific and application-specific lists of contacts or other entities that are acted upon by that computing application. For example, an e-mail client, such as Microsoft Outlook or Lotus Notes, typically contains a personal address book, and an electronic billing and payment (EBP) client, such as CheckFree's WebBillPay (WBP), contains a payee list. These entity lists are commonly referred to as contact lists. A primary benefit of such contact lists is elimination of repeated user entry of the same data within an application.

Some applications "scrub" user supplied contact list data to ensure that improved information is consistently utilized by the application. Scrubbing can include normalizing and/or correcting user supplied data. For example, an application might correct a name, address, funding account information, or a user's account number with a payee. Often a user is unaware that contact list data has been scrubbed. That is, when accessing a contact list, a user may see the originally supplied contact list data, while the computing application may actually utilize scrubbed data in providing functionality to the user.

The scope of each contact list is restricted to its application context. Thus, there may be redundancy in the data between contact lists associated with various computing applications. For example, an e-mail client address entry might contain a name and an e-mail identifier (address), and possibly address/phone information, while an EBP client payee entry might contain the same name and address information, and possibly e-mail identifier. Beyond the same information being stored in multiple locations, i.e., in association with multiple applications, a user must input and update this same information repeatedly, i.e., into each application. This multiple information entry, as will be recognized, is at best inefficient.

Computing applications presuppose a function-centric application invocation metaphor. In other words, a user first launches or otherwise access a computing application, then selects a function to perform within the accessed computing application, and then finally specifies the data to be operated upon by the accessed computing application, perhaps from an available contact list.

While computing applications are function-centric, in some computing domains there is precedence for a data-centric approach in which data is presented via a user interface first, then a function is selected and applied to an element of the data. A simple example is the list of folders/files in the My Documents folder of the Window's operating system. From the My Documents folder a user can right-click on one of the displayed items in the folder (stored files) to bring up a set of function choices that can be performed on that selected file, such as opening the selected file, or deleting the selected file.

There also are computer-based "rolodex" type lists that exist just on their own, independent of any computing application. For example, personal digital assistants (PDAs) such as Palm devices, can maintain an address book conveniently populated through a PC-based user interface. These contact lists are currently incapable of doing more than integrating with other tools (typically e-mail or calendar clients through synchronization). Thus, these type contact lists cannot be used to drive application functionality.

A "Web service" is a network accessible interface to application functionality built using standard Internet technologies. Web services are also known as "common services." A collection of software and tools that enable developers to create, deploy, and access Web services has been proposed by Microsoft. It is important to understand that even though Microsoft's software suite for enabling Web services, known as the .NET platform, is perhaps the most well known, it is by no means the only way to build or use Web services.

A component of Microsoft's original .NET proposal was to offer to consumers a suite of commonly used Web services, dubbed Microsoft .NET My Services. Two of the proposed services are .NET My Contacts, which stores an electronic relationships/address book for a subscriber at a network location distinct from a subscriber's computer, and .NET Passport, which is a subscriber authentication service.

.NET Passport, which has been introduced by Microsoft into the marketplace, allows participating subscribers to create one sign-in name and password for use across participating .NET Passport sites. Additionally, subscribers can save time and avoid repetitive data entry by storing basic demographic information that can be shared with .NET Passport sites. When a subscriber signs in to a participating .NET Passport site, .NET Passport sends the subscriber's identifying information such as ZIP Code, country/region, and city information to the site upon request, or, alternatively a .NET Passport data repository can be accessed by participants in the Web service. Subscribers can also choose to provide more personal information, such as their nickname, E-mail address, age, gender, and language preference.

.NET My Contacts, as disclosed by Microsoft, will allow subscribers to store "address book" type of information, presumably protected and accessed through Passport, at a central location. Microsoft has not defined a user interface for My Contacts, or proposed use scenarios, including interactions between .NET My Contacts data and applications, particularly in the context of EBP.

As will be understood from the discussion above, data stored in existing contact lists and proposed contact lists cannot be utilized by multiple applications. Also, existing and proposed contact lists cannot trigger application functionality. Further, existing and proposed contact lists are not structured such that flexible access control over various aspects of contact information, including population and/or modification of some data by other than the user, is available.

Accordingly, a need exists for an application-independent contact list in which contact data stored therein can be utilized by multiple applications. Also, a need exists for a contact list user interface that supports the triggering of one or more of multiple applications based upon selection of contact data. And, a need exists for an application-independent contact list that provides flexible access control over various segments of contact information, including the ability to allow population or modification of at least a portion of contact data by one or more entities other than a user.

Introduced above, existing EBP computing applications have a function-centric process flow. That is, to direct an EBP transaction a user must first trigger or otherwise access an EBP application, which may be Web-based. After triggering the EBP computing application, the user must select a function (transaction type) to be executed by the accessed EBP computing application. Then, the user must specify or select data, sometimes from an application-specific contact list, associated with the desired function. The specified or selected data might be a payee name, an electronic biller name, or other data, such as an account identifier or date. Only after the user has performed these steps is the desired function executed by the accessed EBP computing application. Thus, due to the function-centric nature of EBP applications, a user cannot conveniently access EBP functionality. He or she must first access an EBP computing application, select a function to be performed, and then select data to be utilized with the selected function. A data-centric EBP process flow would eliminate steps, allowing instant access to desired functionality.

Accordingly, a need exists for an EBP process flow that is data-centric, rather than function-centric.

OBJECTS OF THE INVENTION

It is an object of the present invention to provide a contact list user interface through which a user may access multiple computing applications.

It is also an object of the present invention to provide an EBP process flow that is data-centric, rather than function-centric.

Still another object of the present invention to provide a contact list having stored data that can be utilized by multiple applications.

Yet another object of the present invention is to provide an application independent contact list having stored data that can be accessed, modified, and/or added by one or more entities other than a user associated with the contact list.

The above-stated objects, as well as other objects, features, and advantages, of the present invention will become readily apparent from the following detailed description which is to be read in conjunction with the appended drawings.

SUMMARY OF THE INVENTION

In accordance with the present invention, methods and systems for accessing an electronic commerce function are provided. An electronic commerce function can be, but is not limited to, a submission of an electronic payment request, such as, but not limited to, a bill payment, a retail payment, a person-to-person payment, or a business-to-business payment, a request to view billing information electronically (i.e., be electronically billed), and an electronic request to issue a bill or an invoice. An electronic commerce function is performed via a network. A network can be, but is not limited to, the Internet, a local area network, a wide area network, and the public switched telephone network, as well as any other network capable of transmitting information, including a wireless network. Also, a network can be multiple interconnected networks.

Each system includes one or more communications interfaces and one or more processors. Each communications interface is configured to receive and transmit information via at least one network. Information received by the communications interface is passed on to at least one processor. A processor can be any type of device capable of functioning to implement methods described herein, including, but not limited to, a processor as found in a typical personal computer, main-frame computer, server-type computer, or any other type of computing device. In certain aspects and embodiments of the present invention, a system includes one or more memories configured to store information. A memory can include, as desired, any medium and/or device for storing information.

In accordance with one embodiment of the present invention, a first signal is transmitted from a first network location. The first signal includes information that identifies an entity. The identified entity can be an individual, a business, or an organization. The identifying information can be any information which identifies an entity, including, but not limited to, any or all of, an entity's name, address, and/or phone number. The first signal also includes information that identifies an electronic commerce function associated with the entity. For example, the first signal could include information that identifies a utility company (the entity) and an electronic payment function. Of course, the first signal could include information that identifies multiple electronic commerce functions, each associated with the entity. Also, the first signal could include information that identifies multiple entities and one or more electronic commerce functions associated with each identified entity.

A second signal is received at the first network location in response to the transmitted first signal. The second signal is received from a second network location different than the first network location. This second signal includes information that indicates a selection of an electronic commerce function in association with a particular entity. That is, in accordance with the example above, the second signal could include an indication to make an electronic payment to the utility company.

In response to the received second signal, a third signal is transmitted from the first network location. This third signal, which can be transmitted to the second network location or another network location, includes information that identifies a network address associated with an electronic commerce application. The transmitted network address information can be a URL, a hyper-link, or any other information that identifies a network address. An electronic commerce application is a computing program that provides and/or facilitates the electronic commerce function. That is, in accordance with the example above, the electronic commerce application is a network-based service for making electronic payments. The transmitted third signal also includes information associated with the entity. The information associated with the entity can be any information associated with the entity, including all of, a portion of, or none of, the information identifying the entity included in the first signal.

The transmitted third signal results in a transmission of a fourth signal to the second network location from a third network location. A mere receipt of the third signal can cause transmission of the fourth signal, a further transmission of the third signal can cause transmission of the fourth signal, or a processing of the transmitted third signal, either with or without a further transmission, can cause transmission of the fourth signal. The transmitted fourth signal includes information associated with invoking the electronic commerce function based upon the information associated with the entity included in the third signal. The information associated with invoking the electronic commerce function can be any information utilized by the electronic commerce application in providing and/or facilitating the electronic commerce function. The associated invoking information can include all of, or any of, the information associated with the entity included in the third signal. Also, the associated invoking information can include none of the information associated with the entity included in the third signal. In such a case, the associated information of the third signal is utilized to retrieve, obtain, or calculate the information associated with invoking the electronic commerce function included in the fourth signal. As an example, the fourth signal could be a payment request screen pre-populated with information associated with the utility.

In one aspect of the present invention, the third signal is transmitted to the second network location. The third signal is then further transmitted from the second network location to the third network location. This further transmission could be an automatic transmission, or an operator/user of the second network location could cause the further transmission of the third signal. In this aspect, the fourth signal is transmitted responsive to the further transmitted third signal. That is, the third signal is transmitted to the second network location from the first network location. Then, the third signal is further transmitted to the third network location from the second network location. Upon receipt of the further transmitted third signal at the third network location, the fourth signal is transmitted to the second network location from the third network location.

In another aspect of the present invention, a fifth signal is transmitted from the third network location in response to the transmitted third signal. In this aspect, the transmitted third signal could be either transmitted directly to the third network location by the first network location, or could be a further transmitted signal, perhaps further transmitted by the second network location or another network location. The fifth signal includes a request for other information associated with the entity. That is, the third signal contains first information associated with the entity, and the third network location requests additional information associated with the entity. This fifth signal could be transmitted to the first network location, the second network location, or another network location. The other information could be any information associated with the entity, including, but not limited to, information identifying the entity and/or information necessary to provide and/or facilitate the electronic commerce function with the entity.

A sixth signal is received at the third network location in response to the transmitted fifth signal. This sixth signal includes the requested other information associated with the entity. The fourth signal, in this aspect, is transmitted subsequent to the receipt of the sixth signal. The fourth signal could include all of, any of, or none of, the other information included in the received sixth signal.

According to another aspect of the present invention, the information identifying the electronic commerce function and the entity included in the first signal is presented at the second network location via a contact list user interface. A contact list is a collection of information associated with individuals, businesses, and/or organizations, collectively referred to as contacts. This information typically includes names, phone numbers, and/or addresses of contracts. Thus, in this aspect of the present invention, contact information is stored at the first network location and presented at the second network location. The presentation is preferably a visual presentation, though it can be, as desired, an audible presentation, or a combination visual/audible presentation.

This contact information includes not only information identifying a contact (the entity), but also an electronic commerce function in which the entity is an actor. The selection of the electronic commerce function is based upon the presented information identifying the electronic commerce function. Thus, in this aspect, a contact list user interface that includes information identifying the entity and information identifying an electronic commerce function that can be performed that involves the entity is presented at the second network location. In accordance with the example above, the contact list user interface could include information identifying the utility and information identifying that an electronic request to pay the utility can be submitted. Of course, as will be understood from the discussion herein, the electronic commerce function associated with the entity can be another electronic commerce function other than an electronic payment request.

In a further aspect of the present invention, the information identifying the electronic commerce function included in the first signal is first information identifying an electronic commerce function. In this aspect, the first signal also includes second information identifying another function associated with the entity. The other function can be an electronic commerce function, or another type function. The second information identifying the other function is presented in association with the information identifying the entity and the first information identifying the electronic commerce function.

In still another aspect of the present invention, the third signal does not include information identifying a network address associated with the entity. That is, the first signal does not include information that identifies where on a network, such as, for example, the Internet, a cellular phone network, another other phone network, or any other type network, the entity has a presence.

According to yet another aspect of the present invention, the information associated with invoking the electronic commerce function included in the fourth signal is presented at the second network location via an electronic commerce user interface. This presentation could be visual, audible, or both. Further, some portions of the presentation could be audible, with other portions visual. In this aspect, the electronic commerce function is associated with at least one, if not both, of electronic bill presentment and/or electronic payment.

In a further aspect, the second network location is associated with a user and the electronic commerce function is associated with electronic bill presentment. The presented information includes at least one of four types of information. A first type of information is billing information, which could be bill detail information or bill summary information, from the entity for the user. That is, billing information issued by the entity for the user is electronically presented to the user. A second type of information is billing information associated with one or more past bills issued by the entity for the user. A third type of information is billing information, which could be summary or detailed billing information, associated with a bill or invoice issued by the user for the entity. A fourth type of information is billing information associated with one or more past bills or invoices issued by the user for the entity.

In another further aspect, if the electronic commerce function is associated with electronic bill presentment, the user interface is one of two types of user interfaces associated with electronic bill presentment. A first type of user interface is a biller activation user interface that includes at least a portion of the information associated with the entity included in the transmitted third signal. This first type of user interface is for requesting to begin to receive electronic bill presentment of bills of the entity. A second type of user interface is an invoicing activation user interface that includes at least a portion of the information associated with the entity included in the transmitted third signal. This second type of user interface is for establishing electronic bill presentment of bills, or invoices, issued by the user and directed to the entity. That is, it is for setting up the user to electronically bill the entity. Of course, other types of electronic commerce user interfaces associated with electronic bill presentment could also be presented.

Also in this aspect, if the electronic commerce function is associated with electronic payment, the user interface is one of five types of user interfaces associated with electronic payment. A first type of user interface is a payment request user interface that includes at least a portion of the information associated with the entity included in the transmitted third signal. A payment request user interface is for requesting that a payment be made to the entity on behalf of the user or even a different entity. A second type of user interface is a pending payment request user interface. A pending payment request user interface is associated with a previously submitted request to pay the entity on behalf of a different entity, such as the user. A third type of user interface is a payment history user interface. Through a payment history user interface one can review completed payments to the entity made on behalf of a different entity, such as the user. As desired, the payment history user interface can also reflect pending payments. A fourth type of user interface is a payee setup user interface that includes at least a portion of the information associated with the entity included in the transmitted third signal. A payee setup user interface is for establishing the entity as a payee that may receive payments made on behalf of a different entity, such as the user. A fifth type of user interface is a payment request confirmation screen for presentation after submission of a payment request.

In still another aspect of the present invention, the second network location is again associated with a user. Contact information associated with the entity is stored in a contact list belonging to the user. The stored contact information is retrieved. The retrieved contact information includes at least the information identifying the entity and the information identifying the electronic commerce function. The transmitted identifying information included in the first signal is the retrieved contact information. The contact list can be stored at the first network location or another network location other than the second network location.

According to a further aspect of the present invention, the user is one of a plurality of users. The stored contact information includes at least one of multiple types of contact information. A first type of contact information is private information. Private information is designated as such by the one user and is not accessible by at least a portion of the others of the plurality users. Private could be, as desired, the default designation for all payee-provided information. A second type of contact information is public information. Public information is designated as such by the one user and is accessible by each user. Likewise, public could be, as desired, the default designation for all payee-provided information. A third type of contact information is hidden information. Hidden information is information that is not received from the one user and that is not available for access by any of the plurality of users, including the one user.

Also in this aspect, the information identifying the entity included in the transmitted first signal excludes hidden contact information and the information associated with the entity included in the transmitted third signal includes hidden contact information. Thus, at least a portion of the entity information included in the first signal is different than the entity information included in the third signal.

In a yet a further aspect of the present invention, a fifth signal is received at the first network location. This fifth signal is received from a network location associated with the electronic commerce application. Included in the fifth signal is hidden information associated with the entity. The fifth signal could be received prior to transmission of the third signal, or subsequent to transmission of the third signal. The hidden information included in the received fifth signal is then stored in the contact list.

Also in accordance with the present invention, a database for storing contact list information is provided. The database is stored on a storage medium. Any type of storage medium capable of storing a database may be utilized. The database includes information that identifies an entity, which could be a business, individual, or organization. Contact information can be any of or all of, but is not limited to, the entity's name, nickname(s), address(es), phone number(s), and/or email address(es). Stored in association with the entity identifying information in the contact list is information identifying at least one network address of an associated electronic commerce service provider. That is, each such network address does not identify a network location at which the entity has a presence. Rather, the network address identifies a network location of an entity that provides and/or facilitates electronic commerce, which could be any of or all of, but not limited to, electronic bill presentment, and/or electronic payment.

According to one aspect, the information that identifies the entity is any information other than information that identifies a network address associated with the entity. That is, the contact list does not include a network address associated with the entity.

According to another embodiment of the present invention, a first signal is received at a first network location. The first signal is transmitted from a second network location. The first signal includes information associated with an entity. The entity can be an individual, a business, or an organization. The associated information can be any information associated with an entity, including, but not limited to, any or all of, an entity's name, address, and/or phone number. The first signal also includes information that identifies an electronic commerce function associated with the entity. Of course, the first signal could include information that identifies multiple electronic commerce functions, each associated with the entity. Also, the first signal could include information that identifies multiple entities and one or more electronic commerce functions associated with each identified entity. The first signal also includes information that identifies a network address associated with an electronic commerce application. The transmitted network address information can be a URL, a hyper-link, or any other information that identifies a network address. An electronic commerce application is a computing program that provides and/or facilitates the electronic commerce function.

In response to the received first signal, a second signal is transmitted from the first network location. This second signal is transmitted to the network address included in the first signal. The transmitted second signal is a request to access the electronic commerce function. That is, it is a request for performance of electronic commerce function. The transmitted second signal also includes at least a portion of the information associated with the entity included in the transmitted first signal. A user or operator associated with the first network location is not required to even be aware of some or all of the information associated with the entity included in the transmitted second signal.

A third signal is received at the second network location, from a third network location. The third signal is transmitted in response to the transmitted second signal. The transmitted third signal includes information associated with invoking the electronic commerce function that is based upon the information associated with the entity included in the transmitted second signal. The information associated with invoking the electronic commerce function can be any information utilized by the electronic commerce application in providing and/or facilitating the electronic commerce function. The associated invoking information can include all of, or any of, the information associated with the entity included in the transmitted second signal. Also, the associated invoking information can include none of the information associated with the entity included in the second signal. In such a case, the entity-associated information of the second signal is utilized to retrieve, obtain, or calculate the information associated with invoking the electronic commerce function included in the transmitted third signal.

In one aspect of this embodiment, information identifying the entity, information identifying the electronic commerce function, and a link to access the electronic commerce function, is displayed at the first network location. This displayed information is based upon the received second signal. It should be noted that the displayed link could be, as desired, the same as, or separate from, the information identifying the electronic commerce function. According to this aspect, the second signal is transmitted responsive to an activation of the displayed link. As an example of the transmission of the second signal responsive to the activation of the link, the link could be, but is not required to be, an overloaded URL that contains all the information to be included in the transmitted second signal. In this example, the information contained in the overloaded URL is preferably not displayed, though it could, as desired, be. Of course, other techniques could be used in transmitting the second signal.

It will also be understood by those skilled in the art that the invention is easily implemented using computer software. More particularly, software can be easily programmed, using routine programming skill, based upon the description of the invention set forth herein and stored on a storage medium which is readable by a computer processor to cause the processor to operate such that the computer performs in the manner described above.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIG. 1 is a simplified depiction of stored information associated with an extended contact list of the present invention.

FIG. 8 is an exemplary summary view user presentation of the extended contact list in accordance with certain aspects of the present invention.

DETAILED DESCRIPTION OF PREFERRED EMBODIMENT(S)

Figure 2:
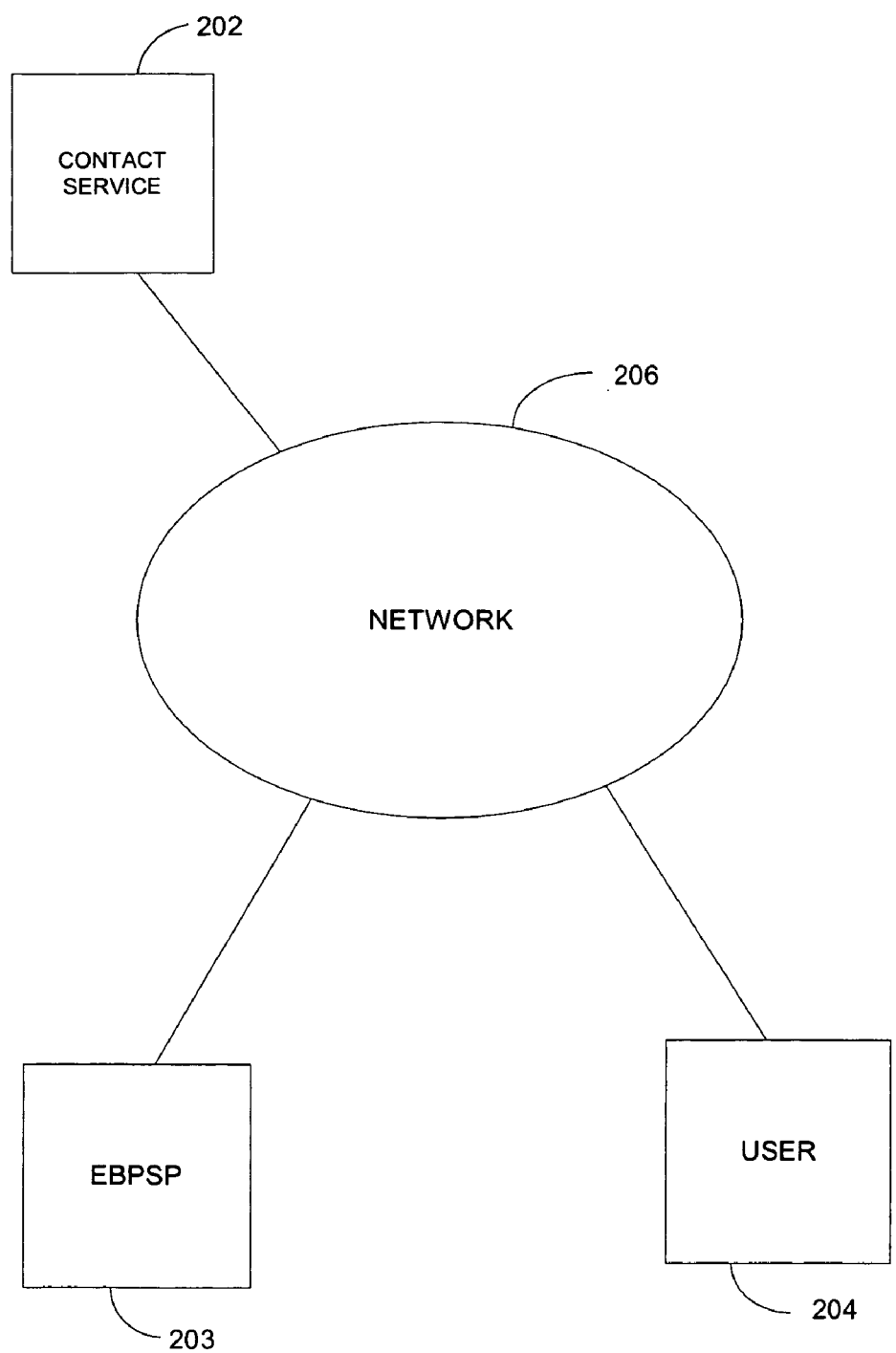
FIG. 2 is an exemplary network diagram depicting the extended contact list of FIG. 1 hosted by a contact service in accordance with certain aspects of the present invention.

An extended contact list for storing information usable by multiple computing applications and from which multiple computing applications may be triggered is provided by the present invention. The extended contact list includes not only information identifying and associated with one or more entities, but also information associated with one or more computing applications. The storing computing application information is linked to the stored entity information. Linked information is presented together via a contact list user interface.

The extended contact list, in one embodiment, is stored by a contact service at a central location on a network, to be discussed further below. The contact service could be .NET My Contacts, discussed above, could be another Web service, or even could be a computing application service provider. Preferably, multiple extended contact lists, each associated with a different user, are stored by the contact service. In another embodiment, an individual user's extended contact list is stored on that user's computer.

FIG. 1 is a simplified depiction of stored information associated with a single entry 100 of the extended contact list of the present invention, no matter where stored. Each entry is segregated into a general portion 105 containing contact information identifying an entity, and zero or more computing application-specific portions containing information for use by a computing application, which could be a Web-based computing application, or a computing application residing on a user's computer. FIG. 1 depicts a single application-specific portion 106. However, any single entry could have two or more application-specific portions, or even no application-specific portions.

General information is any information typically contained in a contact list. General information may be, as desired by a user, subdivided into a public portion 105A and a private portion 105B. Information in the public portion 105A is information the user is willing to make publicly available to all, which includes potentially all network users. Information in the private portion 105B is information the user wishes to protect, i.e., make available to less than (possibly none of) the full public. In the example of FIG. 1, the user has chosen to make all general information in entry 100 private.

As seen in FIG. 1, each entry includes multiple data fields 107A-107N. Some data fields may apply to both the general portion 105 and at least one application-specific portion 106, e.g., data fields 107A-107D. Some data fields may only apply to an application-specific portion 106, e.g., data fields 107E-107N in columns 106A and 106B. Some data fields may only apply to the general portion 105, e.g., data fields 107E-107F in column 105B. It is not mandatory that each data field include information, whether supplied by a user or an application. Thus, for any given entry, some data fields may be considered mandatory (i.e., must be filled in), while other fields may be considered optional (i.e., need not contain data). The multiple data fields in the general portion 105 include: the entry's name 107A/105B, including first and last name, title, and company; the entry's address 107B/105B, including street, city, state, ZIP, and country; the entry's phone numbers 107C/105B, including work phone number, home phone number, fax phone number, mobile phone number, and other phone number; the entry's e-mail identifier (address) 107D/105B; one or more user—or application—customizable fields 107E/105B; and a categorization, i.e., business, friend, etc, field 107F/105B. Other fields, whether optional or mandatory, may be included and are within the scope of the present invention.

FIG. 1 shows a single application-specific portion 106 included in entry 100, which in this example is related to an EBP application. An application-specific portion 106 consists of application-specific data and overrides to information in the general portion 105. Data stored in the application-specific portion 106 is utilized by an application in providing functionality to a user to which the contact list belongs. An application-specific portion may be further subdivided. A first subdivision is a private portion 106A, consisting of information the user can enter/modify/see and which he wishes to protect, making it available to less than the full public. The second subdivision is a hidden portion 106B, consisting of information entered by the application with which the application-specific portion 106 is associated, which the user cannot modify/see, and which is as protected as the private portion. This hidden portion 106B consists of scrubbed data and/or data populated into the entry 100 by the application with which the application-specific portion 106 is associated.

As the user creates an application-specific portion 106, he may provide overrides for many of the items in the general portion 105. For example, he may refer to the entity by an alternate name, or provide an alternate address, phone number or e-mail identifier. In addition, the user must specify an application to associate with application-specific portion 106. Associating an entry with an application will be discussed further below. The user may further provide additional application-specific fields. For example, for an associated EBP computing application, the user may provide an account number at the entity, and possibly even provide payment account-related information.

An associated computing application may place scrubbed versions of private portion 106B information in the hidden portion 106B, though this may not always be required. That is, an associated computing application will perform scrubbing when required by that computing application. For example, an EBP application may normalize or correct the entity name, address, or payment account information, or the user's account number. In addition, an associated computing application may insert supplemental information, such as an identifier by which the entity is known to the associated computing application.

FIG. 2 is a network diagram depicting a contact service 202 that maintains the extended contact list in communication with an application service provider, in this example an EBP service provider (EBPSP) 203, and a user 204 via a network 206. Network 206 can be the Internet, or one or more other networks. It should be noted that other types of application service providers could be in communication with the contact service 202, as well as other users. However, for the sake of simplicity, only a single application service provider, EBPSP 203, and only a single user, user 204, are depicted in FIG. 2. It should also be noted that the functionality of the contact service 202 could be split, such that one entity maintains the data and controls access to it, while another entity presents the user interface to the data. However, for the sake of simplicity, the discussion below relates to a single entity performing both of these functions. The contact service 202 stores an extended contact list on behalf of user 204.

In the present example the EBPSP 203 provides an electronic payment application, sometimes referred to as e-payments, and provides an electronic billing application, sometimes referred to as e-billing, utilizing data stored by the contact service 202. The EBPSP 203 can also provide other electronic commerce services. It should be noted that a single application providing both e-payments and e-billing could be provided by the EBPSP 203.

The contact service 202 maintains a computing system for hosting extended contact lists and communicating with EBPSP 203 and user 204. The computing system includes one or more computing platforms, with one computing platform 300 being shown in FIG. 3. When multiple computing platforms are utilized, they are networked together. Each computing platform 300 consists of one or more processors 303 configured to execute programming instructions, which may be, as desired, hardcoded or softcoded, stored in one or more memories 305. Each computing platform 300 also includes one or more communication interfaces 315 for transmitting and receiving data at via network 206. As desired, a communication interface 315 also transmits and/or receives data via one or more other networks not depicted in FIG. 2.

Figure 3:
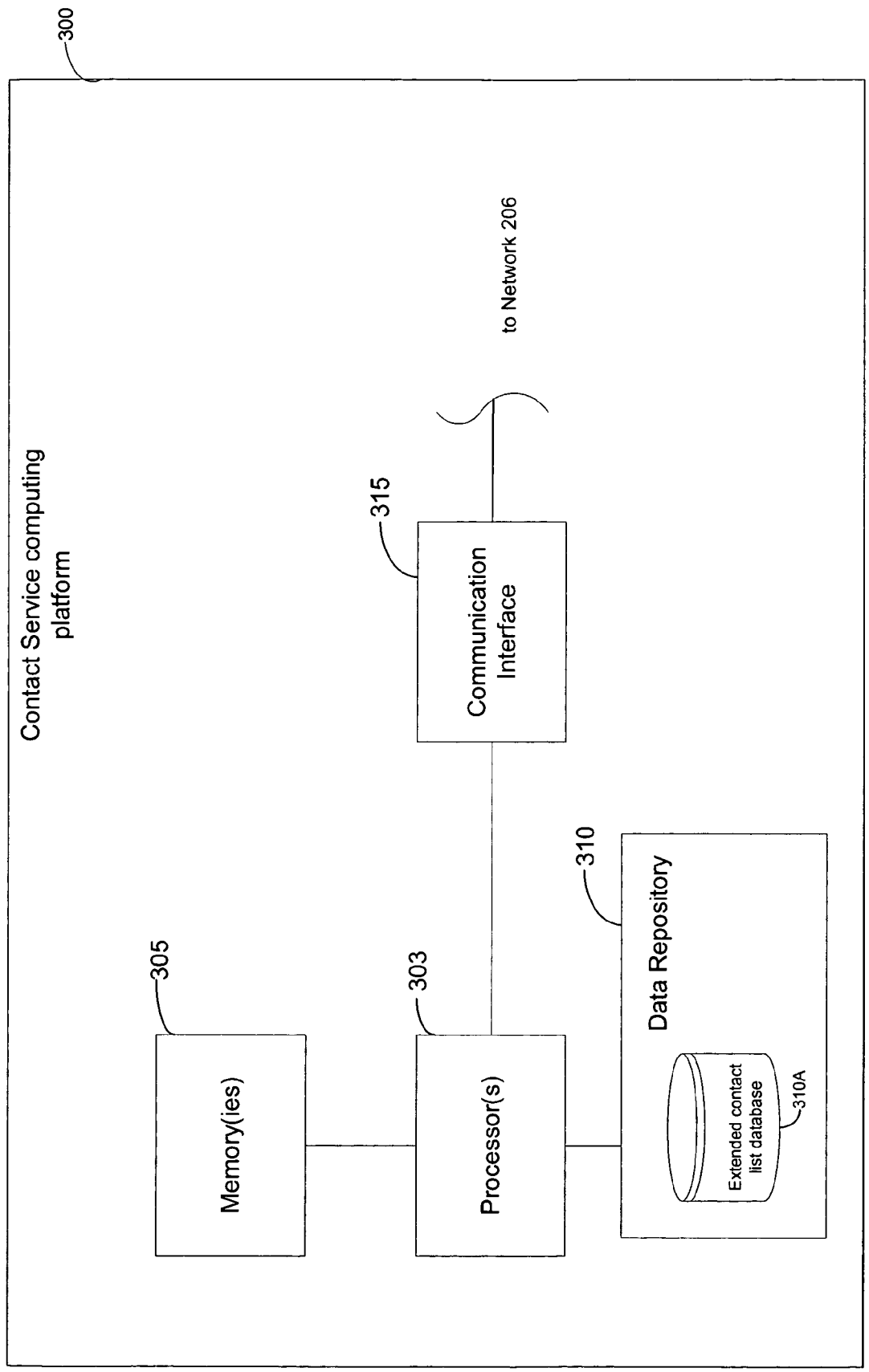
FIG. 3 is a simplified depiction of a computing platform associated with the contact service of FIG. 2 in accordance with certain aspects of the present invention.

The contact service computing system also includes a data repository 310, which may reside on a computing platform 300, or be distributed on dedicated database servers, or elsewhere on a computing network connecting multiple computing platforms. FIG. 3 depicts data repository 310 residing on a computing platform 300. Data repository 310 includes one or more extended contact lists databases 310A for storing users' contact lists. As necessary, a computing platform 300 includes interfaces, including, but not limited to, any of a display, keyboard, mouse, microphone, disk, tape, and printer, not shown in FIG. 3. Such devices are collectively referred to as I/O interfaces.

Figure 4:
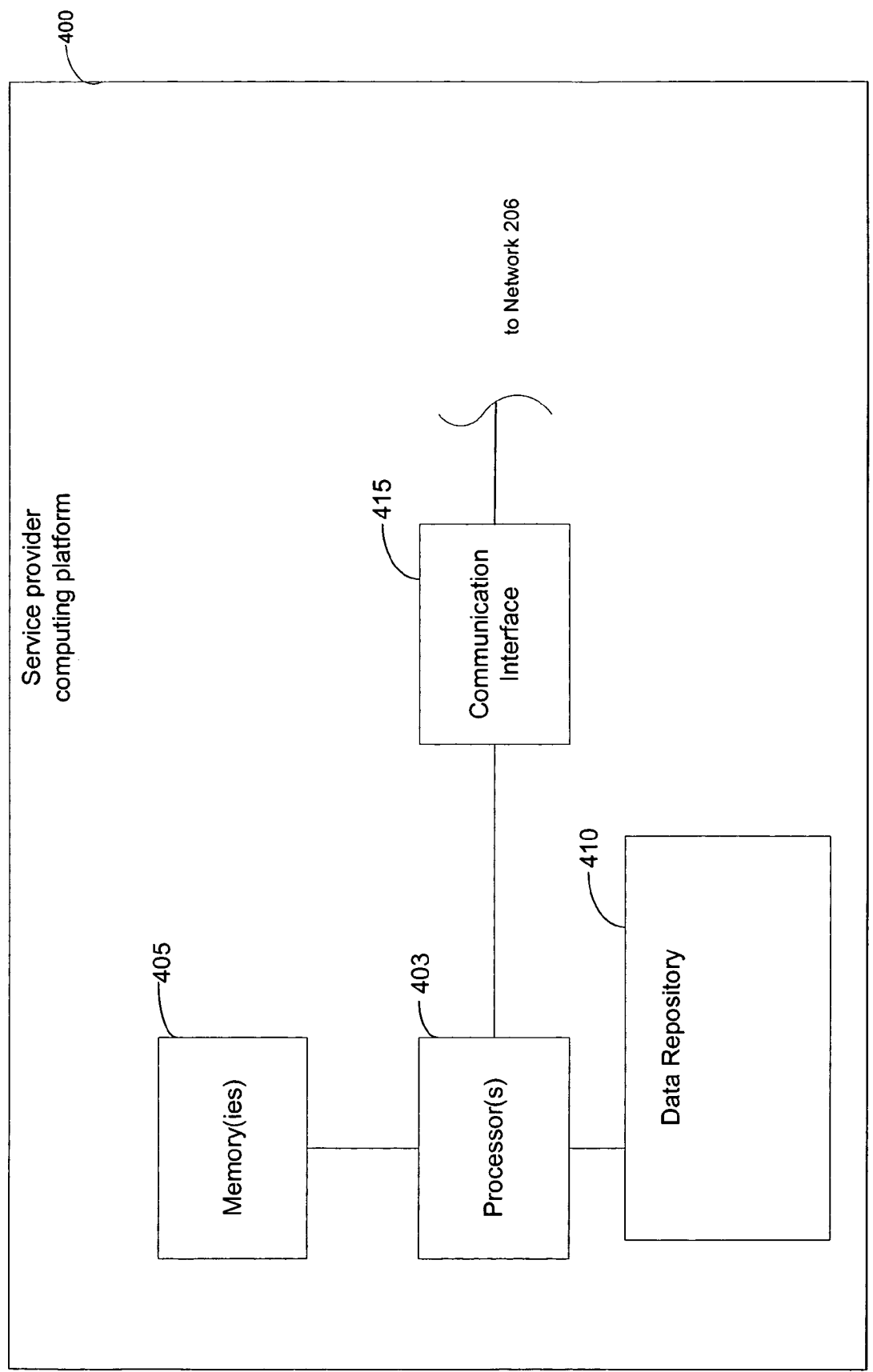
FIG. 4 is a simplified depiction of a computing platform associated with a service provider which utilizes information stored in the extended contact list of FIG. 1 in providing functionality in accordance with certain aspects of the present invention.

The EBPSP 203 is also associated with a computing system. FIG. 4 is a simplified exemplary depiction of a computing platform 400) for use by the EBPSP 203. Like the computing system of the contact service 202, the computing system of the EBPSP 203 includes one or more computing platforms, with one computing platform 400 being shown in FIG. 4. When multiple computing platforms are utilized, they are networked together. Each computing platform 400 consists of one or more processors 403 configured to execute programming instructions which may be hardcoded or softcoded, stored in one or more memories 405. Each computing platform 400 also includes one or more communication interfaces 415 for transmitting and receiving data at via network 206. As desired, a communication interface 415 also transmits and/or receives data via one or more other networks not depicted in FIG. 2.

The EBPSP computing system also includes a data repository 410, which may reside on a computing platform 400, or be distributed on dedicated database servers, or elsewhere on a computing network connecting multiple computing platforms. FIG. 4 depicts data repository 410 residing on a computing platform 300. Data repository 410 stores information associated with providing EBP services to user 204, and preferably other users. As necessary, a computing platform 400 has I/O interfaces, not shown in FIG. 4.

Figure 5:
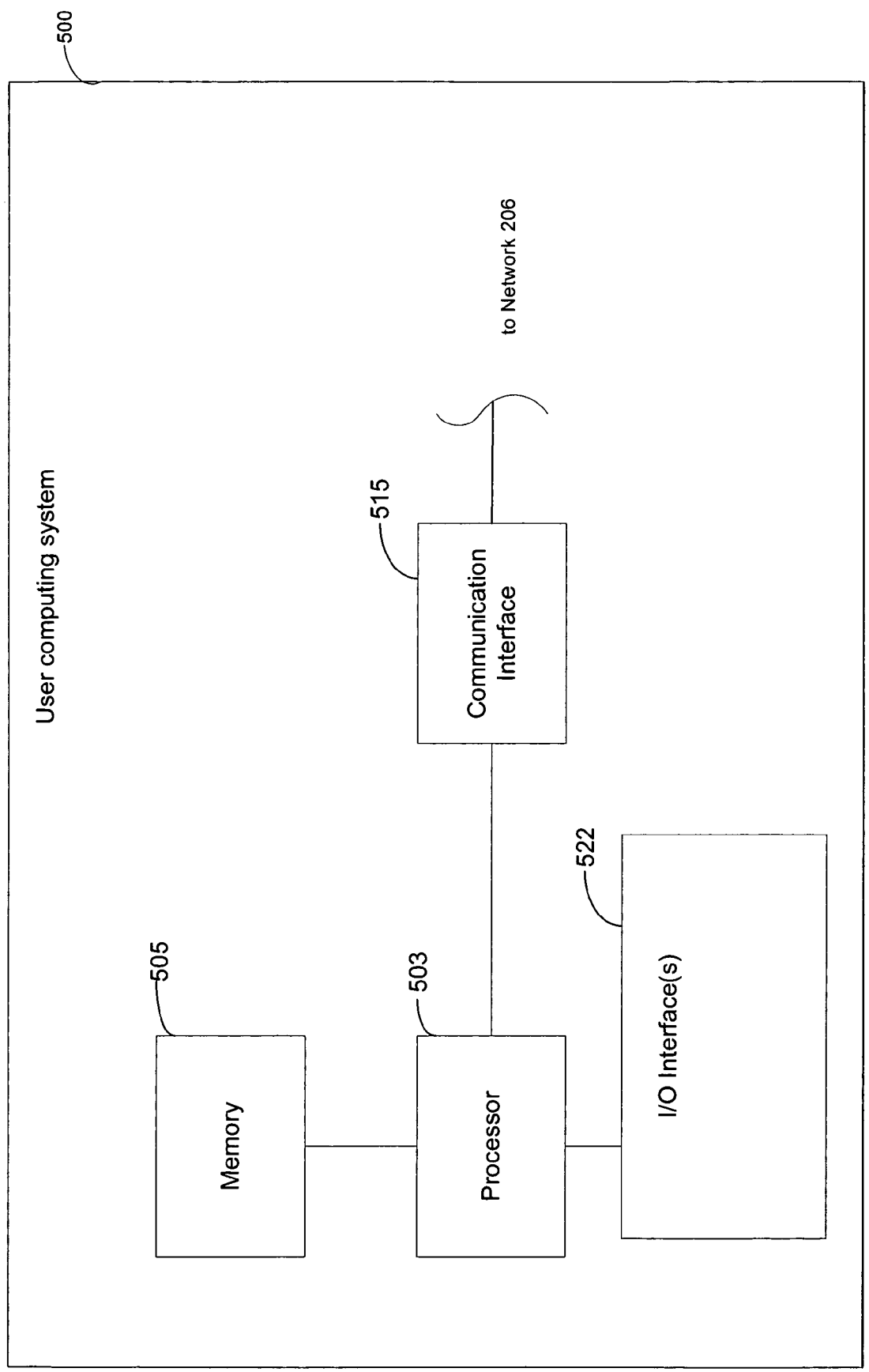
FIG. 5 is a simplified depiction of a computing system associated with a user to whom information stored in the extended contact list of FIG. 1 belongs in accordance with certain aspects of the present invention.

FIG. 5 is a simplified exemplary depiction of a computing system 500 for use by user 204. System 500 includes a processor 503 configured to execute programming instruction stored in a memory 505. System 500 also includes a communication interface 515 for transmitting and/or receiving information via the network 206. Computing system 500, as necessary, also includes I/O interfaces 522, which preferably includes at least a display and keyboard.

In an alternative implementation, an application service provider, such as EBPSP 203, hosts the extended contact list instead of the contact service 202. In such a case, the application service provider hosting the extended contact lists would perform the same functions performed by the contact service 202 described herein. Also, in another alternative implementation, the user's computing system 500 hosts the extended contact list in memory 505.

Preferably, access to the extended contact list is controlled by a user authentication mechanism, such as Microsoft's .NET Passport, when not hosted on the user's computing system 500 In the example included herein, .NET Passport is shown as the authentication mechanism, though it should be understood that any authentication mechanism could be utilized.

Figure 6:
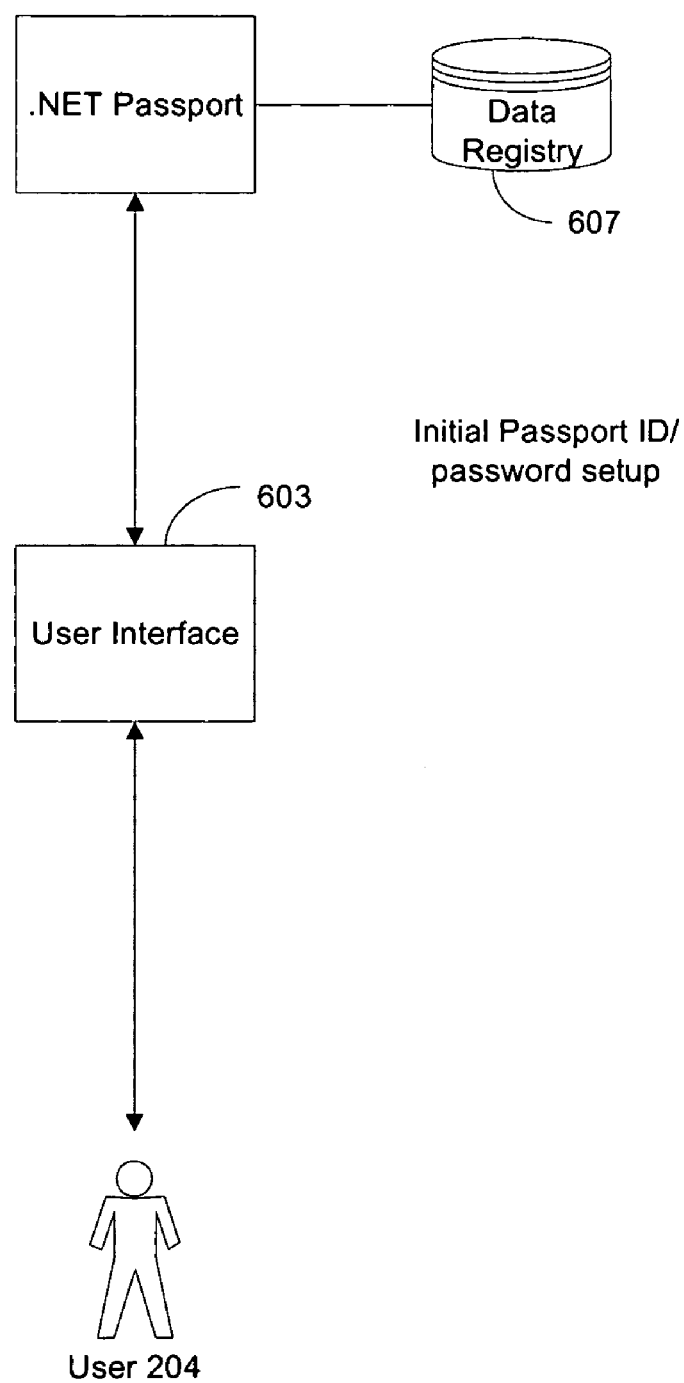
FIG. 6 is a simplified depiction of a user obtaining network credentials in accordance with certain aspects of the present invention.

FIG. 6 depicts user 204 obtaining a .NET Passport utilizing a user interface 603. EBPSP 203, contact service 202, or any entity participating in the .NET Passport framework could present user interface 603. Via user interface 603, user 204 obtains an ID/password combination that is stored in a .NET Passport data registry 607 in association with information identifying and associated with user 204, typically including an e-mail identifier.

Figure 7:
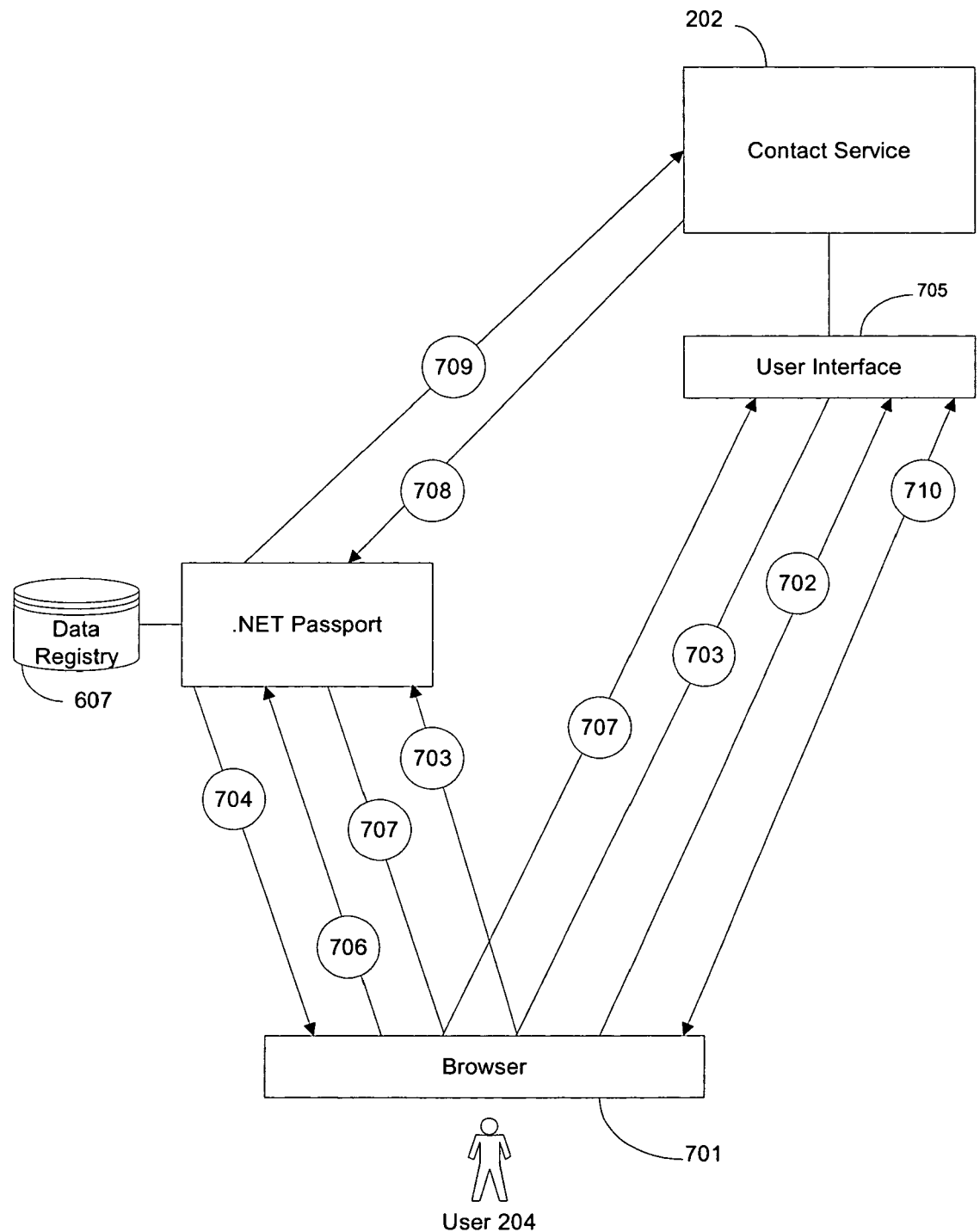
FIG. 7 is a simplified exemplary depiction of a user accessing an extended contacts list stored at a network location utilizing network credentials in accordance with certain aspects of the present invention.

As shown in FIG. 7, detail 702, the first time user 204 directs a Web browser 701 to an extended contact user interface (UI) 705 hosted by the contact service 202 computing system, there are no accompanying authentication credentials from .NET Passport and the extended contact UI 705 detects this. The extended contact UI 705 redirects the user's browser to .NET Passport for authentication, detail 703. A .NET Passport computing system presents a screen to user 204 asking for authentication credentials (at a minimum, password), and whether it is desired to have this "remembered" for future sessions from this browser 701 at the contact service, detail 704.

At detail 706, user 204 responds. For simplicity, it is assumed the user 204 indicates that he or she wants the credentials "remembered" so that they do not have to be provided at each visit to the contact service 202. .NET Passport updates its local repository 607, provides "cookies" to the user's browser 701, and redirects browser 701 back to the contact service UI 705, as shown in detail 707. The redirection includes an encrypted authentication query string that indicates to the contact service 202 that the user 204 has been successfully authenticated. As desired, the contact service 202 requests any available profile information on the user 204 from the .NET Passport database 607, detail 708.

As shown in detail 709, .NET Passport returns any available profile information on the user 204 to the contact service 202. User 204 is now authenticated. The contact service 202 then allows the user 204 full access to the extended contact lists via the user interface 705, detail 710. This could include creating an extended contact list, adding entries to an existing extended contact list, accessing existing entries, and/or modifying existing entries.

FIG. 8 is an exemplary summary view 800 of an extended contact list as presented to user 204 via the contact service UI 705. It should be noted that differently configured contact information presentations could be presented and are within the scope of the present invention. It should also be noted that the exemplary summary view 800 could be presented by another entity hosting the extended contact list, or could be presented by the user system 500 if the extended contact list is hosted by the user system 500.

In the summary view 800 entries are presented in an abbreviated form, only showing a subset of key fields of FIG. 1. The entries are sorted, in this instance by Name 801. Entries can also be sorted by company 805, primary contact information 807, category 810, or even by associated application 812, as desired by user 204. Note that presented information may combine, as desired, individual data elements (e.g., Name 801 is a combination of last name and first name), or presented information may derive, as desired, from different fields depending on user preference settings (e.g., Primary Contact 807 in some cases is a phone number and in some cases is an e-mail identifier). The categorization 810 permits user-specified grouping and filtering.

Associated applications column 812 indicates the application(s) that are associated with individual entries in the extended contact list, and permits accessing of each application from a position on the entry. In the example of FIG. 8, applications are shown as user-selectable icons. Alternatively, a URL or other type of link could be presented. Or, a right mouse-click when positioned on the entry could bring up an entry-customized set of choices.

In this example, the envelope symbol is used to denote an application that can send the entity a message. This could be the same application invariably (e.g., an e-mail client). Or, the application could vary depending on available information (e.g., could trigger a fax or a mailing of a letter). For varying applications, another component could reside between the expanded contact list presentation and the invoked application. This might be, as desired, a plug-in or other similar extension to the extended contacts list.

Alternatively, this could be the first application invoked, which would then invoke an appropriate application based upon the available information. In such cases, the intermediary application component receives an identification of the function/icon and a set of parameters (public/private/hidden) associated with the entry. For the example of the envelope icon, among the parameters provided might be a street address, fax number, and/or e-mail address associated with the entity. The intermediary component directs a traditional postal delivery of a document to the street address, a fax of a document to the fax number, or an e-mail of the document to the e-mail address, based upon which type of information has been provided, the intermediary component preferably implements rules-based precedence ordering, which it could establish itself, or potentially have established as a user preference via a user preference-setting user interface. The $ symbol indicates an EBP application. Here, too, the symbol could indicate the same application invariably, or change according to available information (e.g., could be one type EBP application for business-to-business payments, and another type EBP application for person-to-person payments). Based upon provided parameters (information) an intermediary application determines, in one alternative, if the entity is a business or personal entity, and triggers either a business-to-business or a person-to-person payment. Of course, other types of payments could be triggered, depending upon the provided information and/or other factors. Alternatively, a different application icon (e.g., the empty box) could be used to denote a different type EBP application from that associated with the $ symbol.

Figure 9:
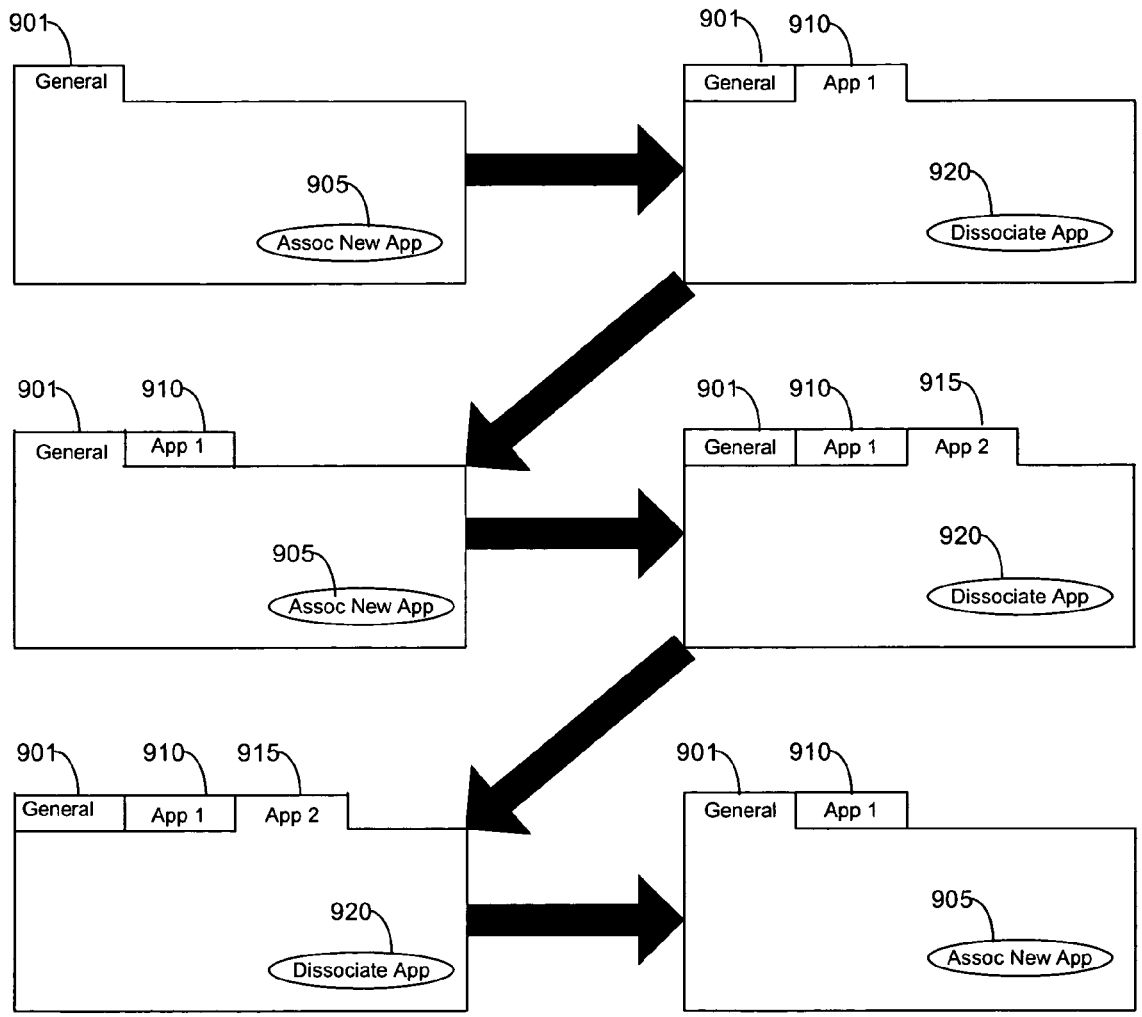
FIG. 9 is an exemplary detailed view user presentation of the extended contact list showing the association and disassociation of computing application with an entry of the extended contact list in accordance with certain aspects of the present invention.

FIG. 9 is an exemplary detail view of an extended contact list entry. This view is helpful in detailing the associating and disassociating of a computing application with an entry in the extended contact list. In the detailed view, each entry is associated with a general page 901 for capturing and showing all individual data fields 107A-N in the general portion 105 of the entry 100 of FIG. 1, i.e., not those that are application-specific. A general page 901 is preferably subdivided into a "public" portion and a "private" portion, or individual fields displayed on the page (not shown in FIG. 9) may have an indicator by each to allow the user 204 to direct that a particular field be public 105A or private 105B.

Each general page 901 includes an "Assoc New App" button 905 to allow the user 204 to associate a computing application with an entry. Upon activating this button 905, a new page is created 910 (labeled App 1). This page supports the capture and showing of just private elements. The user must specify the application to be associated, as this typically will define application-specific supplemental fields. Specification of an application can be achieved in any of a number of ways, as will be understood by one of ordinary skill in the art. An application could be selected from a closed list presented by the contact service 202, or the user 204 could be required to enter an application identifier. If the user 204 must enter an application identifier, application-specific fields will have to be entered as custom fields by the user 204).

If the user 204 wishes to associate a second computing application with the same entry, he may do so by once again activating the "Assoc New App" button 905 on the General page 901. As shown, a second application-specific page 915 (labeled App 2) is created upon a second activation of button 905.

A "Dissociate App" button 920 is provided on each application-specific page. If the user 204 wishes to dissociate a computing application from an entry, he can select the "Dissociate App" button 920 on the appropriate application page. Upon selection of a "Dissociate App" button 920, and preferably after application-specific validation and user confirmation, that page is removed (and any associated icon or URL is removed from the summary view). FIG. 9 shows App 2 being dissociated from an entry.

In order to focus on the invention at hand, it is assumed that the user 204 has already enrolled with the EBPSP 203 and can be authenticated by the EBPSP 203 given the presentation of proper credentials, such as .NET Passport information. Two processing alternatives exist for computing application invocation from the extended contact list. One is a "push" scenario (in which information stored in the extended contact list of the present invention is pushed to the application), and the other is a "pull" scenario (in which an associated application retrieves contact information from the expanded contact list. Both the push and the pull scenario are available whether the extended contact list is hosted by the contact service 202, the user computing system 500, or elsewhere.

Figure 10:
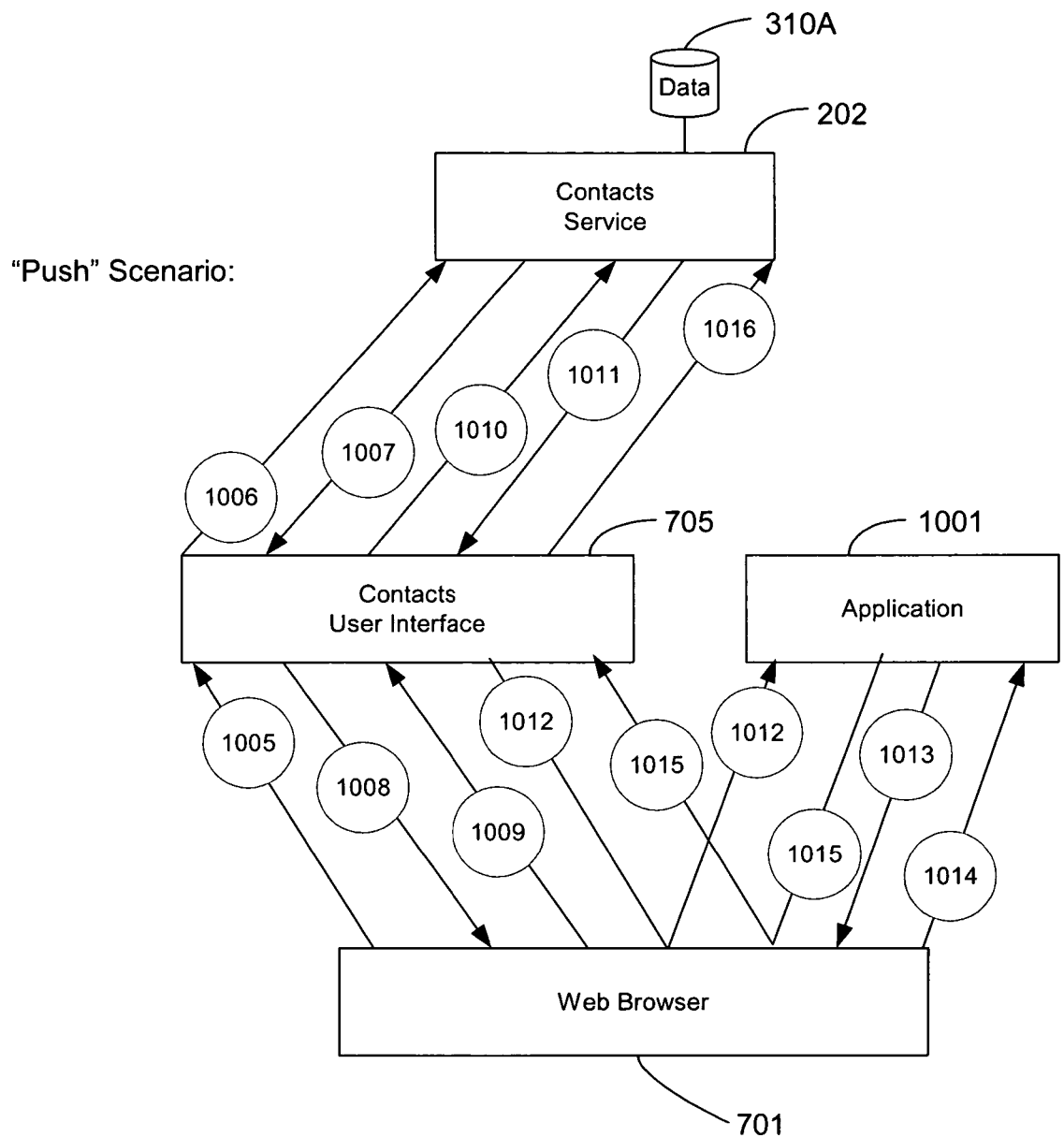
FIG. 10 is a simplified exemplary depiction of extended contact list information being pushed to a computing application by a contact service in accordance with certain aspects of the present invention.

FIG. 10 is a simplified depiction of the "push" scenario in accessing application functionality offered by the EBPSP 203 when the extended contacts list is hosted by the contact service 202. At detail 1005, the user 204, via Web browser 701, requests to view the summary view of contact information. This request is transmitted by the communications interface 515 of the user system 500 to a communication interface 315 of the contact service 202 via the network 206. It will be appreciated that all communications between the user 204, the contact service 202, and the EBPSP 203, shown in FIG. 10 as computing application 1001, are via the network 206. After receipt of the request, the contact user interface 705 requests appropriate information, i.e. contact information for display in the summary view, from the contact service 202, detail 1006. The requested information for presentation to user 204 is information stored in the extended contact list database 310A.

At detail 1007 the contact service 202 passes the requested information to the contact user interface 705. The contact user interface 705 in turn passes the retrieved information to the user's Web browser 701, where it is then presented as a summary view, including application icons, detail 1008. The user 204 selects a function to invoke in association with a particular entity, via an I/O device 522. In the present example, the user 204 selects an EBP function offered by the EBPSP 203. The user selection is then transmitted back to the contacts user interface 705, detail 1009.

At detail 1010, after receiving the user selection, the contact user interface 705 requests all relevant stored information associated with the EBP application from the contacts service 202, including a network address associated with the EBPSP 203. This may include, for any given associated application, a combination of general and public/hidden application-specific information. The contact service 202 passes the requested information to the contact user interface 705, detail 1011. The contact user interface 705, utilizing the retrieval network address, redirects the user browser 701 to the application 1001, detail 1012. The retrieved contact information is bundled as a set of accompanying tagged parameters in a query string or as part of a "post" command or some equivalent Web mechanism in the redirection. Preferably, though not required, information identifying the user 204 is included in the bundle.

At detail 1013 the application 1001 transmits an appropriate function page with fields populated from the passed parameters to the user 204, requesting confirmation from the user. The function page is then presented to the user. The user 204 confirms the function, detail 1014, via an I/O device 522. Thereafter, the application 1001 performs the requested function.

After performing the requested function, the application 1001 may beneficially redirect the user browser 701 to the contact user interface 705, appending a set of return tagged parameters to add/update "hidden" values, detail 1015. The contacts user interface passes this information to the contacts service 202, detail 1016. The contacts service 202 then adds/updates "hidden" values, utilizing passed information. This is the scrubbing of data.

Figure 11:
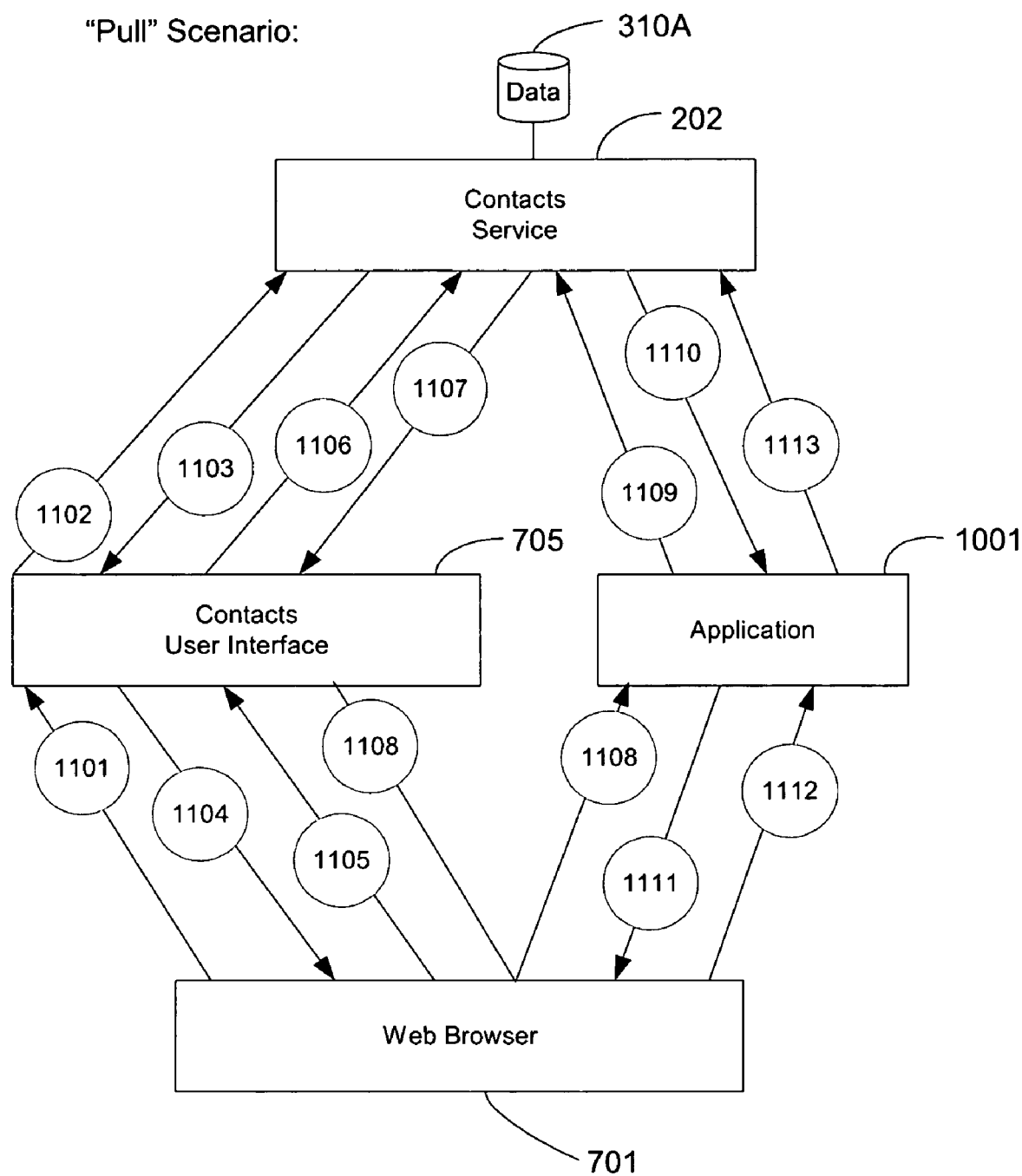
FIG. 11 is a simplified exemplary depiction of extended contact list information being pulled by a computing application from a contact service in accordance with certain aspects of the present invention.

FIG. 11 is a simplified depiction of the "pull" scenario when the extended contact list is hosted by the contact service 202. At detail 1101 the user 204, via Web browser 701, requests to view a summary view of contact information, as above in FIG. 10. The contact user interface 705 requests appropriate stored information from the contact service 202, detail 1102, and the contact service 202 passes the requested information to the contact user interface 705, detail 1103, also as above.

At detail 1104, the contact user interface 705 transmits the summary view, including application icons, to the user 204. This information is presented to the user 204. The user 204 selects a function to invoke in association with a particular entity, detail 1105, as above. Different than the push scenario, the contact user interface 705 requests only an entity identifier from the contact service 202 if not already in a memory, detail 1106. That is, if user 206 has previously requested to invoke a function associated with that entity, the entity identifier may be, as desired, retained by the contacts user interface 705.

The contact service 202 passes the requested information to the contact user interface 705, detail 1107. The contact user interface 705 redirects the user browser 701 to the requested application 1001, bundling only a minimal set of information (entry identifier+crypto-token to delegate authority to access information at contact service 202) as a set of accompanying tagged parameters in a query string or as part of a "post"

command or some equivalent Web mechanism, detail 1108. As above, preferably information identifying the user 204 is included in the bundle.

At detail 1109, the application 1001 requests the full set of relevant information, via network 206, from the contact service 202, using the crypto-token delegation access authorization from the user 204 and the entity identifier. The contact service 202 passes the requested information to the application 1001, detail 1110, via network 206.

The application 1001 transmits an appropriate function page with fields populated from the information received from the contact service 202 to the user 204, requesting confirmation from the user 204, detail 1111. This function page is presented to the user 204 by Web browser 701. At detail 1112 the user 204 confirms the function, via an I/O device 522. As necessary, the application 1001 adds/updates "hidden" values in the appropriate entry directly via the contact service 202, detail 1113.

It should be noted that, in both the push and the pull scenarios, the user selection of a function to invoke might not require retrieval of information from the contact service 202 by the contact user interface 705 prior to redirection if the icon or link has already been previously associated with the correct bundle of information. In that case, the user browser 701 would be directed immediately to the application upon selection of the icon or link. That is, the bundle of information could be stored for easy access by the contacts user interface 705.

Also, though not shown, although the general 105 and application-specific 106 portions of the contact information may appear to be unified, they could be, as desired maintained in separate data repositories by separate applications. Thus, the general information may be maintained by the contact service 202, but the application-specific portions could be maintained in a more local repository maintained by another entity.

As will be recognized from the discussion above, the present invention provides data-centric application invocation. That is, via the extended contact list the user 204 first selects data and then a function to be performed utilizing that data, whether a push or a pull scenario is utilized. In the present example of data-centric application invocation, the extended contact list is maintained by the contact service 202, and user 204 invokes an EBP application offered by the EBPSP 203. The EBP application could include one or more types of functionality, including, but not limited to, electronic payments, electronic bill presentment, electronic bill issuance, often called invoicing, and financial transaction history viewing. Alternatively, the extended contact list can be stored on the user's computing system 500, and user 204 invokes application functionality of any kind either offered by a service provider, or performed by the user's computing system 500.

The information associated with the EBP application 1001 passed to the EBP application 1001 includes at least information identifying and associated with the entity whose contact information the user 204 is viewing when an application icon is activated, and preferably information identifying the user 204. The passed information associated with the entity could be any of, or all of, the entity's name, address, e-mail identifier, the user's account number with the entity, an entity phone number, and/or other application-specific data fields. It should be noted that information indicating a location of the entity, whether on a network or a physical location, does not have to be passed. If the requested transaction is a payment to the entity, the passed information preferably includes information identifying a payment account associated with the user 204. Payment account information could be stored in the extended contacts list, or elsewhere.

If the user 204 has not set up the entity with the EBPSP 203, the user must activate the entity for the requested transaction. That is, the user must activate the entity as a payee, a biller, and/or a bill recipient. The EBPSP 203 transmits an activation user presentation to the user 204. The activation user interface is preferably pre-populated with at least a portion of the passed information.

If the passed information is insufficient for the EBPSP 203 to fulfill the requested transaction, which may be because the entity is not yet activated, in one alternative the EBPSP 203 presents a screen to the user 204 for the user 204 to supply the missing information. Alternatively, the EBPSP 203 could obtain the information without requesting it from the user 204. U.S. patent application Ser. No. 09/892,897, filed Jun. 28, 2001 and entitled "Inter-Network Financial Services" and assigned to the Assignee of the present application, is incorporated herein in its entirety and discloses techniques for obtaining missing information. Also, U.S. patent application Ser. No. 10/285,707, filed Nov. 1, 2002 and entitled "Easy User Activation Of Electronic Commerce Services" and assigned to the Assignee of the present application, is incorporated herein in its entirety and discloses other techniques for obtaining missing information.

After the EBPSP 203 obtains all necessary information, whether all from the contact service 202, from one or more other sources, or from both the contact service 202 and one or more other sources, the EBPSP 203 fulfills the requested transaction. Another source could include the user 204. For a requested payment, the payment could be a paper payment, such as a draft, check, or other paper instrument, or could be an electronic payment, such as an ACH-based electronic funds transfer. For a requested bill issuance, the bill could be issued electronically, perhaps utilizing a passed e-mail identifier, or could be a paper bill, perhaps utilizing passed physical address information.

For a requested electronic bill presentment of a bill issued by the entity to the user 204, the electronic bill presentation could be presentation of only bill summary data, with links to another site for bill detail, or bill detail directly. The EBPSP 203 could beneficially, as desired, utilize techniques disclosed in U.S. patent application Ser. No. 10/285,707, introduced above, in electronically presenting bills to the user 204. Also, techniques disclosed in U.S. Pat. No. 6,289,322, assigned to the Assignee of the present application and incorporated herein in its entirety, and U.S. Pat. No. 6,055,567, also assigned to the Assignee of the present application and incorporated herein in its entirety, may beneficially be utilized in electronic presentation of a bill.

For a requested electronic presentation of past financial transactions, facilitated by the EBPSP 203, between the entity and the user 204, the EBPSP 203 could also beneficially utilize techniques disclosed in U.S. patent application Ser. No. 10/285,707. Preferably, the presentation of historical data may be sorted, as desired by the user 204, by transaction date, status, or other attributes.

The present invention is not to be limited in scope by the specific embodiments described herein. Indeed, various modifications of the present invention in addition to those described herein will be apparent to those of skill in the art from the foregoing description and accompanying drawings. Thus, such modifications are intended to fall within the scope of the appended claims.

What is claimed is:

1. A method for accessing an electronic commerce function, comprising:

transmitting, from a first network location, a first signal including information identifying an entity and information identifying an electronic commerce function associated with the entity;

receiving responsive to the transmitted first signal, at the first network location and from a second network location, a second signal including information indicating a selection of the electronic commerce function identified in the first signal; and transmitting, from the first network location and responsive to the received second signal, a third signal including information identifying a network address associated with an electronic commerce application and information associated with the entity, wherein the transmitted third signal is operable to cause transmission of a fourth signal to the second network location from a third network location, the fourth signal including information associated with invoking the electronic commerce application based at least in part upon the information associated with the entity included in the third signal.

2. The method of claim 1, wherein the information associated with the entity included in the transmitted third signal includes at least a portion of the information identifying the entity included in the transmitted first signal.

3. The method of claim 1, wherein the third signal is transmitted to the second network location, and further comprising:

further transmitting the third signal from the second network location to the third network location, wherein the fourth signal is transmitted responsive to the further transmitted third signal.

4. The method of claim 1, further comprising:

transmitting, from the third network location and responsive to the transmitted third signal, a fifth signal including a request for other information associated with the entity; and receiving, at the third network location, a sixth signal transmitted responsive to the fifth signal and including the requested other information associated with the entity, wherein the fourth signal is transmitted subsequent to the receipt of the sixth signal.

5. The method of claim 1, further comprising:

presenting the information identifying the entity and identifying the electronic commerce function included in the transmitted first signal at the second network location via a contact list user interface, wherein the information identifying the entity is presented in association with the information identifying the electronic commerce function, and wherein the selection of the electronic commerce function is based at least in part upon the presented information identifying the electronic commerce function.

6. The method of claim 5, wherein:

the information identifying an electronic commerce function associated with the entity included in the transmitted first signal is first information identifying an electronic commerce function associated with the entity, the first signal includes second information identifying another function associated with the entity, the other function is one of an electronic commerce function, or another function other than an electronic commerce function, and the second information identifying the other function included in the transmitted first signal is presented in association with the information identifying the entity via the contact list user interface.

7. The method of claim 1, wherein the third signal does not include information identifying a network address associated with the entity.

8. The method of claim 1, further comprising:

presenting the information associated with invoking the electronic commerce application included in the transmitted fourth signal at the second network location via an electronic commerce user interface, wherein the electronic commerce application is associated with at least one of electronic bill presentment or electronic payment.

9. The method of claim 8, wherein:

the second network location is associated with a user, the electronic commerce application is associated with electronic bill presentment, the presented information associated with invoking the electronic commerce application includes at least one of i) billing information associated with a bill from the entity for the user, ii) billing information associated with one or more past bills from the entity for the user, iii) billing information associated with a bill from the user for the entity, or iv) billing information associated with one or more past bills from the user for the entity, and billing information includes at least one of i) summary billing information, or ii) bill detail information.

10. The method of claim 8, wherein:

the second network location is associated with a user, the electronic commerce application is associated with electronic bill presentment, and the electronic commerce user interface is one of i) a biller activation user interface pre-populated with at least a portion of the information associated with the entity included in the transmitted third signal, or ii) an invoicing activation user interface pre-populated with at least a portion of the information associated with the entity included in the transmitted third signal.

11. The method of claim 8, wherein:

the second network location is associated with a user, the electronic commerce application is associated with electronic payment, and the electronic commerce user interface is one of i) a payment request user interface pre-populated with at least a portion of the information associated with the entity included in the transmitted third signal, the pre-populated information identifying the entity as a payee, ii) a pending payment request user interface associated with a pending payment to the entity on behalf of the user, iii) a payment history user interface associated with one or more prior payments to the entity on behalf of the user, iv) a payee setup user interface pre-populated with at least of portion of the information associated with the entity included in the transmitted third signal, or (v) a request confirmation screen for presentation after submission of a payment request.

12. The method of claim 1, wherein the second network location is associated with a user, wherein the information identifying the entity is first information identifying the entity, wherein the information identifying the electronic commerce function is first information identifying the electronic commerce function, and further comprising:

storing contact information associated with the entity in a contact list associated with the user; and retrieving the stored contact information, wherein the stored contact information includes second information identifying the entity and second information identifying the electronic commerce function, wherein the first information identifying the entity and the first information identifying the electronic commerce function included in the transmitted first signal include at least a portion of the retrieved contact information, and wherein the contact list is stored at one of the first network location or another network location other than the second network location.

13. The method of claim 12, wherein:

the user is one of a plurality of users, and the stored contact information includes at least one of i) private contact information designated by the one user as information not available for access by at least a portion of the plurality of users other than the one user, ii) public contact information designated by the one users as information available for access by the plurality of user, or iii) hidden contact information not received from the one user and not available for access by any of the plurality of users.

14. The method of claim 13, wherein:

the stored contact information includes hidden contact information, the information identifying the entity included in the transmitted first signal excludes hidden contact information, and the information associated with the entity included in the transmitted third signal includes hidden contact information.

15. The method of claim 14, further comprising:

receiving, at the first network location, a fifth signal including hidden contact information associated with the entity, the fifth signal transmitted from a network location associated with the electronic commerce application; and storing the hidden contact information included in the received fifth signal in the contact list.

16. The method of claim 1, wherein the first network location and the third network location comprise a single network location.

17. A system for accessing an electronic commerce function, comprising:

a communications interface configured to (i) transmit to a remote network location a first signal including information identifying an entity and information identifying an electronic commerce function associated with the entity, (ii) receive a second signal, transmitted responsive to the first signal and from the remote network location, including information indicating a user selection of the electronic commerce function identified in the first signal, and (iii) transmit a third signal including information identifying a network address associated with an electronic commerce application and information associated with the entity; and a processor configured to cause the communications interface to transmit the first signal, and to cause the communications interface to transmit the third signal responsive to the receipt of the second signal, wherein the transmitted third signal is operable to cause transmission of a fourth signal to the remote network location from another network location, the fourth signal including information associated with invoking the electronic commerce application based at least in part upon the information associated with the entity included in the third signal.

18. The system of claim 17, wherein:

the third signal is transmitted to the remote network location, the remote network location further transmits the third signal to the other network location, and the fourth signal is transmitted responsive to the further transmitted third signal.

19. The system of claim 17, wherein:

the third signal is transmitted to the other network location, the other network location transmits, responsive to receipt of the third signal, a fifth signal including a request for other information associated with the entity, and receives a sixth signal including the requested other information associated with the entity, and the fourth signal is transmitted by the other network location responsive to receipt of the sixth signal.

20. The system of claim 17, wherein the remote network location is associated with one of a plurality of users, and further comprising:

a memory configured to store contact information associated with the entity in a contact list associated with the one user, wherein the information identifying the entity and information identifying the electronic commerce function included in the transmitted first signal is presented to the one user at the remote location, the information identifying the entity presented in association with the information identifying the electronic commerce function via a contact list user interface, wherein the selection of the electronic commerce function is based at least in part upon the presented information identifying the electronic commerce function, and wherein the stored contact information includes the information identifying the entity and information identifying the electronic commerce function.

21. The system of claim 20, wherein:

the stored contact information includes at least one of i) private contact information designated by the one user as information not available for access by at least a portion of the plurality of users other than the one user, ii) public contact information designated by the one user as information available for access by the plurality of users, or iii) hidden contact information not received from the one user and not available for access by any of the plurality of users.

22. The system of claim 21, wherein:

the stored contact information includes hidden contact information, the information identifying the entity included in the transmitted first signal excludes hidden contact information, and the information associated with the entity included in the transmitted third signal includes hidden contact information.

23. The system of claim 17, wherein:

the transmitted information associated with invoking the electronic commerce application is presented to a user at the remote network location via an electronic commerce user interface pre-populated with at least a portion of the information associated with the entity included in the transmitted third signal, and the electronic commerce application is associated with at least one of electronic bill presentment or electronic payment.

24. The system of claim 23, wherein:

the electronic commerce application is associated with electronic bill presentment, the presented information associated with invoking the electronic commerce application includes at least one of i) billing information associated with a bill from the entity for the user, ii) billing information associated with one or more past bills from the entity for the user, iii) billing information associated with a bill from the user for the entity, or iv) billing information associated with one or more past bills from the user for the entity, and billing information includes at least one of i) summary billing information, or ii) bill detail information.

25. The system of claim 23, wherein:
the electronic commerce application is associated with electronic bill presentment, and the electronic commerce user interface is one of i) a biller activation user interface pre-populated with at least a portion of the information associated with the entity included in the transmitted third signal, or ii) an invoicing activation user interface pre-populated with at least a portion of the information associated with the entity included in the transmitted third signal.

26. The system of claim 23, wherein:
the electronic commerce application is associated with electronic payment, and
the electronic commerce user interface is one of i) a payment request user interface pre-populated with at least a portion of the information associated with the entity included in the transmitted third signal, the pre-populated information identifying the entity as a payee, ii) a pending payment request user interface associated with a pending payment to the entity on behalf of the user, iii) a payment history user interface associated with one or more prior payments to the entity on behalf of the user, iv) a payee setup user interface pre-populated with at least of portion of the information associated with the entity included in the transmitted third signal, or (v) a request confirmation screen for presentation after submission of a payment request.

27. The system of claim 17, wherein:
the information identifying the entity and the information identifying an electronic commerce function included in the first signal is presented to a user at the remote network location via a contact list user interface,
the information identifying the entity is presented in association with the information identifying the electronic commerce function, and
the user selection of the electronic commerce function is based at least in part upon the presented information identifying the electronic commerce function.

28. The system of claim 27, wherein:
the information identifying an electronic commerce function associated with the entity included in the transmitted first signal is first information identifying an electronic commerce function associated with the entity,
the first signal includes second information identifying another function associated with the entity,
the other function is one of an electronic commerce function, or another function other than an electronic commerce function, and
the second information identifying the other function included in the transmitted first signal is presented in association with the information identifying the entity via the contact list user interface.

29. The system of claim 17, wherein the processor is further configured to control at least a portion of the operations of the other network location.

30. A method for accessing an electronic commerce function, comprising:
receiving a first signal at a first network location, the first signal transmitted from a second network location and including information associated with an entity, information identifying an electronic commerce function associated with the entity, and information identifying a network address associated with an electronic commerce application;
transmitting, from the first network location and responsive to the received first signal, a second signal to the received network address, the second signal requesting access to the electronic commerce application and including at least a portion of the received information associated with the entity; and
receiving a third signal at the first network location, the third signal transmitted from a third network location responsive to the transmitted second signal and including information, based at least in part upon the information associated with the entity included in the transmitted second signal, associated with invoking the electronic commerce function.

31. The method of claim 30, further comprising:
displaying, at the first network location and based at least in art upon the received first signal, information identifying the entity, information identifying the electronic commerce function, and a link to access the electronic commerce application,
wherein the second signal is transmitted responsive to an activation of the displayed link.

32. A system for accessing an electronic commerce function, comprising:
a memory configured to store information associated with an entity, information identifying an electronic commerce function associated with the entity, and information identifying a network address associated with an electronic commerce application;
a communications interface configured to (i) receive a first signal requesting access to at least a portion of the stored information, and (ii) transmit a second signal; and
a processor configured to (i) retrieve, responsive to the receipt of the first signal, the stored information, information identifying the electronic commerce function, the stored information identifying the network address, and at least a portion of the stored information associated with the entity, and (ii) cause the communications interface to transmit the second signal,
wherein the transmitted second signal includes the retrieved information and is operable at a network location to cause transmission of a third signal, the third signal requesting access to the electronic commerce application and including at least a portion of the information associated with the entity included in the transmitted second signal, and
wherein the transmitted third signal is operable to cause transmission of a fourth signal to the network location, the fourth signal including information associated with invoking the electronic commerce application based at least in part upon the information associated with the entity included in the transmitted third signal.

33. A method for accessing an electronic commerce function, comprising:
transmitting, from a first network station associated with a service provider to a second network station, a first signal including information associated with an entity, information identifying an electronic commerce function associated with the entity, and information identifying a network address associated with an electronic commerce application,
wherein a second signal is received at the network address from the second network station responsive to the received first signal, the second signal requesting access to the electronic commerce application and including at least a portion of the received information associated with the entity, and wherein a third signal is transmitted to the second network location from the third network location responsive to the transmitted second signal, the third signal including information, based at least in part upon the information associated with the entity included in the transmitted second signal, associated with invoking the electronic commerce function.

\* \* \* \* \*

UNITED STATES PATENT AND TRADEMARK OFFICE
CERTIFICATE OF CORRECTION

| | | |
|---|---|---|
| PATENT NO. | : 7,395,319 B2 | Page 1 of 1 |
| APPLICATION NO. | : 10/748678 | |
| DATED | : July 1, 2008 | |
| INVENTOR(S) | : Harris et al. | |

It is certified that error appears in the above-identified patent and that said Letters Patent is hereby corrected as shown below:

Column 21, Line 16 – Change "user" to --users--

Column 24, Line 20 – Change "art" to --part--

Column 24, Line 37 – Remove "information,"

Column 25, Line 5 – Change "the" to --a--

Signed and Sealed this

Ninth Day of September, 2008

JON W. DUDAS
*Director of the United States Patent and Trademark Office*